United States Patent
Katsuragawa

(10) Patent No.: US 9,414,302 B2
(45) Date of Patent: Aug. 9, 2016

(54) WIRELESS COMMUNICATION SYSTEM, MOBILE STATION, CSG TYPE BASE STATION, HOME SUBSCRIBER SERVER, PROGRAM, INTEGRATED CIRCUIT, AND BASE STATION

(75) Inventor: Hiroshi Katsuragawa, Osaka (JP)

(73) Assignee: Sharp Kabushiki Kaisha, Osaka (JP)

(*) Notice: Subject to any disclaimer, the term of this patent is extended or adjusted under 35 U.S.C. 154(b) by 187 days.

(21) Appl. No.: 14/129,147

(22) PCT Filed: Jun. 26, 2012

(86) PCT No.: PCT/JP2012/066244
§ 371 (c)(1),
(2), (4) Date: Dec. 24, 2013

(87) PCT Pub. No.: WO2013/002208
PCT Pub. Date: Jan. 3, 2013

(65) Prior Publication Data
US 2014/0133398 A1    May 15, 2014

(30) Foreign Application Priority Data
Jun. 28, 2011    (JP) .................................. 2011-142430

(51) Int. Cl.
*H04W 48/16* (2009.01)
*H04W 48/20* (2009.01)
*H04W 84/04* (2009.01)

(52) U.S. Cl.
CPC .............. *H04W 48/16* (2013.01); *H04W 48/20* (2013.01); *H04W 84/045* (2013.01)

(58) Field of Classification Search
CPC .... H04W 48/16; H04W 28/20; H04W 84/045
See application file for complete search history.

(56) References Cited

U.S. PATENT DOCUMENTS 8,265,551 B2    9/2012 Saito et al.
8,467,723 B2    6/2013 Saito et al.
(Continued)

FOREIGN PATENT DOCUMENTS

WO    2009/011135 A1    1/2009
WO    2010/022369 A1    2/2010

OTHER PUBLICATIONS

Official Communication issued in International Patent Application No. PCT/JP2012/066244, mailed on Aug. 7, 2012.
Samsung, "Verizon Wireless Network Extender User Manual", 2010, 66 pages.
(Continued)

*Primary Examiner* — Melvin Marcelo
(74) *Attorney, Agent, or Firm* — Keating & Bennett, LLP

(57) ABSTRACT

In a mobile communication system including a plurality of RATs (Radio Access Technologies), the necessity of a control channel for notifying RAT information is eliminated, and the lack of capacity of the control channel can be avoided. In a mobile station 30 communicating with base stations employing the different RATs by employing the respective RATs, when the mobile station executes procedures for registration to an LTE (Long-term evolution) base station 10-2 which allows access to only registered mobile stations that are registered in advance, the mobile station obtains, from a HSS (Home Subscriber Server) 40 tied to the LTE base station 10-2, information of another base station that performs communication by employing the RAT different from that used by the LTE base station 10-2.

5 Claims, 5 Drawing Sheets

(56) References Cited

U.S. PATENT DOCUMENTS

| | | |
|---|---|---|
| 2010/0048217 A1 | 2/2010 | Deshpande et al. |
| 2010/0197223 A1 | 8/2010 | Saito et al. |
| 2011/0171953 A1* | 7/2011 | Faccin ............ H04W 48/08 455/426.1 |
| 2012/0309390 A1 | 12/2012 | Saito et al. |

OTHER PUBLICATIONS

3GPP TS 25.331 V10.0.0, "3rd Generation Partnership Project; Technical Specification Group Radio Access Network; Radio Resource Control (RRC); Protocol specification; (Release 10)", Jun. 2010; 1792 pages.

* cited by examiner

WIRELESS COMMUNICATION SYSTEM, MOBILE STATION, CSG TYPE BASE STATION, HOME SUBSCRIBER SERVER, PROGRAM, INTEGRATED CIRCUIT, AND BASE STATION

TECHNICAL FIELD

The present invention relates to a mobile communication system includes a plurality of Radio Access Technologies (RATS).

BACKGROUND ART

It is proposed to deploy a small-cell wireless communication base station device that covers a small-zone area of several tens meters, such as homes, offices, and so on, in addition to a macro cell that is a currently-used large cell in an existing mobile communication system. Such a small-cell wireless communication base station device is called a "Home Node B (HNB)".

Furthermore a Closed Subscriber Group (CSG) Cell is also studied as the function of the HNB which allows access to only limited group members, e.g., family members of the home where the HNB is deployed.

On the other hand, in the existing mobile communication system, various Radio Access Technologies (RATs), e.g., W-CDMA (Wideband Code Division Multiple Access), LTE (Long-term evolution), WLAN (Wireless LAN), WiMAX (Worldwide Interoperability for Microwave Access), exist together. Thus, the cover areas of plural RATs overlap each other in a service area of a mobile communication system.

In such a mobile communication system, a mobile station is required to be able to detect which cover area of RATs the mobile station locates and what communication services the mobile station can receive now. For instance, when the cover area of WLAN is included in a part of the cover area of LTE, a mobile station located in the cover area of WLAN cannot receive communication services of WLAN and can receive only communication services of LTE, unless the mobile station can detect that it is now positioned in the cover area of WLAN.

As related art, there is a technique enabling a mobile station to detect the cover area of RATs where the mobile station locates now, by a base station of a RAT (e.g., LTE) notifying information of another RAT (e.g., WLAN) to the mobile station based on the location information of the mobile station (see Non Patent Literature (NPL) 1).

Another related art proposes that a base station of LTE utilizes the physical property of a part of its transmit signal to notify the presence of another RAT (see Patent Literature (PTL) 1).

CITATION LIST

Patent Literature

PTL 1: International Publication No. 2009/011135

Non Patent Literature

NPL 1: 3GPP TS 25.331 V10.0.0 (2010-06); Technical Specification Group Radio Access Network; Radio Resource Control (RRC); Protocol specification (Release 10)
NPL 2: Network Extender user manual, Verizon Wireless

SUMMARY OF INVENTION

Technical Problem

In the related art of NPL 1, however, a control channel is needed to notify information of another RAT to each mobile station. According to NPL 1, for example, when the cover area of WLAN is included in a part of the cover area of LTE, a base station of LTE is needed to notify RAT information for WLAN (e.g., information regarding RAT type and the cover area of WLAN) to each mobile station by using a control channel of LTE. Accordingly, a large capacity of the control channel has been consumed to notify the RAT information.

Furthermore, the related art of PTL 1 proposes the use of a fundamental parameter for wireless communication, e.g., a carrier frequency of a base station, to notify the presence of RAT. However, it is not preferable to change such a fundamental value.

The present invention has been accomplished in view of the situation described above, and an object of the present invention is to provide, in a mobile communication system including a plurality of RATs, a wireless communication system, a mobile station, a CSG type base station, a home subscriber server, a program, an integrated circuit, and a base station, which can eliminate the necessity of a control channel for notifying RAT information, and which can avoid the lack of capacity of the control channel.

Solution to Problem (1) To achieve the above object, the present invention is constituted as follows. The present invention provides a wireless communication system comprising a first base station employing a first radio access technology and having a first cover area, a second base station employing the first radio access technology and having a second cover area that is partly and entirely included in the first cover area, the second base station being a CSG (Closed Subscriber Group) type base station which allows access to only registered mobile stations that are registered in advance, a third base station employing a second radio access technology different from the first radio access technology and having a third cover area that is almost same as the second cover area, a mobile station including communication means which can communicates with each of the first base station and the second base station by using the first radio access technology, and can communicates with the third base station by using the second radio access technology, and a home subscriber server that manages information to tie the second base station, which is the CSG type base station, and the registered mobile station, wherein the home subscriber server manages a database associated to the second base station, and the database includes information indicating presence of the third base station, the home subscriber server notifies to the mobile station the information indicating the presence of the third base station having almost same cover area as covered by the second base station, and the mobile station receives the information indicating the presence of the third base station having almost same cover area as covered by the second base station in accordance with the notification from the home subscriber server.

Thus, since the mobile station can obtain from the database the information of the presence of the third base station employing the second radio access technology that is different from the first radio access technology employed by the CSG type base station, the mobile station can know the presence of the third base station and can access the third base station. Moreover, since the mobile station can previously obtain usage information indicating which RAT is available, the present invention can eliminate the necessity of notifying the usage information via the control channel from network and can avoid the lack of capacity of the control channel in a mobile communication system where plural RATS exist together.

(2) In the wireless communication system of the present invention, the database of the home subscriber server further includes related information to access the third base station.

With that feature, the mobile station can access the third base station employing the second radio access technology that is different from the first radio access technology employed by the CSG type base station.

(3) In the wireless communication system of the present invention, the home subscriber server notifies the information of the presence of the third base station to the mobile station at time when the mobile station is moved into the cover area of the second base station that is the CSG type base station, and the mobile station receives the information of the presence of the third base station in accordance with the notification from the home subscriber server.

With that feature, the mobile station can know the presence of the third base station and can access the third base station without receiving unnecessary information provided via the control channel.

(4) In the wireless communication system of the present invention, when the information of the third base station is updated, the home subscriber server notifies the updated information of the third base station to the mobile station, and the mobile station updates the information of the third base station in accordance with the notification from the home subscriber server.

With that feature, the mobile station can know the update of the information of the third base station and can access the third base station without receiving unnecessary information provided via the control channel.

(5) In the wireless communication system of the present invention, the second base station maintains the information indicating the presence of the third base station having the third cover area and notifies the update of the information of the third base station to the home subscriber server when the information of the third base station is updated, the home subscriber server updates the information of the third base station in accordance with the notification from the second base station and notifies the updated information of the third base station to the mobile station, and the mobile station updates the information of the third base station in accordance with the notification from the home subscriber server.

With that feature, the mobile station can know the update of the information of the third base station and can access the third base station without receiving unnecessary information provided via the control channel.

(6) In the wireless communication system of the present invention, the mobile station communicates with the third base station by using the second radio access technology, which is different from the first radio access technology employed by the second base station, in accordance with the information indicating the presence of the third base station having almost same cover area as covered by the second base station.

With that feature, the mobile station can access the third base station without receiving unnecessary information provided via the control channel.

(7) The present invention also provides a wireless communication system comprising a first base station employing a first radio access technology and having a first cover area, a second base station employing the first radio access technology and having a second cover area that is partly or entirely included in the first cover area, the second base station being a CSG (Closed Subscriber Group) type base station which allows access to only registered mobile stations that are registered in advance, a third base station employing a second radio access technology different from the first radio access technology and having a third cover area that is almost same as the second cover area, and a mobile station including communication means which can communicate with each of the first base station and the second base station by using the first radio access technology, and can communicate with the third base station by using the second radio access technology, wherein the second base station maintains information indicating presence of the third base station.

Thus, since the second base station as the CSG type base station maintains the information of the presence of the third base station having almost same cover area as covered by the second base station, the mobile station can know the presence of the information of the third base station and can access the third base station without receiving unnecessary information provided via the control channel.

(8) Furthermore, the present invention provides a mobile station used in a wireless communication system comprising a first base station employing a first radio access technology and having a first cover area, a second base station employing the first radio access technology and having a second cover area that is partly or entirely included in the first cover area, the second base station being a CSG (Closed Subscriber Group) type base station, and a third base station employing a second radio access technology different from the first radio access technology and having a third cover area that is almost same as the second cover area, the mobile station communicating with each of the base stations employing the first radio access technology or second radio access technology by using the first radio access technology or the second radio access technology, wherein the mobile station maintains a database regarding the second base station as the CSG type base station with which the relevant mobile station is able to communicate, and the database includes information indicating presence of the third base station having almost same cover area as covered by the second base station.

With that feature, since the mobile station maintains a tag tied to second base station and indicating the presence of the third base station having almost same cover area as covered by the second base station that is the CSG type base station, the mobile station can know the presence of the information of the third base station and can access the third base station without receiving unnecessary information provided via the control channel.

(9) In the mobile station of the present invention, the database includes related further information to access the third base station.

With that feature, the mobile station can access the third base station employing the second radio access technology that is different from the first radio access technology employed by the CSG type base station.

(10) Still further, the present invention provides a mobile station used in a wireless communication system comprising a first base station employing a first radio access technology and having a first cover area, a second base station employing the first radio access technology and having a second cover area that is partly or entirely included in the first cover area, the second base station being a CSG (Closed Subscriber Group) type base station, a third base station employing a second radio access technology different from the first radio access technology and having a third cover area that is almost same as the second cover area, and a home subscriber server that manages information to tie the second base station which is the CSG type base station which allows access to only registered mobile stations that are registered in advance with the registered mobile station, the mobile station communicating with each of the base stations employing the first radio access technology or second radio access technology by using the first radio access technology or the second radio access technology, wherein the mobile station receives from the home subscriber server information indicating presence of the third base station having almost same cover area as covered by the second base station in the procedures for registration of the mobile station to the second base station that is the CSG type base station.

Thus, since the mobile station receives from a database associated with the CSG type base station the information of the third base station employing the second radio access technology that is different from the first radio access technology employed by the CSG type base station in the procedures for registration of the mobile station to the second base station that is the CSG type base station, the mobile station can know the presence of the third base station and can access the third base station without receiving unnecessary information provided via a control channel. Moreover, in a mobile communication system including a plurality of RATs, since the mobile station can previously obtain usage information indicating which RAT is available, the present invention can eliminate the necessity of notifying the usage information via the control channel from network and can avoid the lack of capacity of the control channel.

(11) In the mobile station of the present invention, the mobile station communicates with the third base station by using the second radio access technology, which is different from the first radio access technology employed by the second base station, in accordance with the information indicating the presence of the third base station having almost same cover area as covered by the second base station, the information being maintained in the home subscriber server.

With that feature, the mobile station can know the presence of the third base station and can access the third base station without receiving unnecessary information provided via the control channel.

(12) Still further, the present invention provides a CSG (Closed Subscriber Group) type base station used in a wireless communication system comprising a first base station employing a first radio access technology and having a first cover area, a second base station employing a second radio access technology different from the first radio access technology and having a second cover area that is partly or entirely included in the first cover area, a mobile station communicating with each of the base stations employing the first radio access technology or second radio access technology by using the first radio access technology or the second radio access technology, the CSG type base station which allows access to only registered mobile stations that are registered in advance, and a home subscriber server that maintains information to tie the CSG type base station with the registered mobile station, the CSG type base station employing the first radio access technology and having same cover area as the second cover area, wherein the CSG type base station provides, to the home subscriber server, information of the second base station having the second cover area and tied to information of the CSG type base station.

With that feature, the mobile station can know the presence of the third base station and can access the second base station without receiving unnecessary information provided via the control channel. Moreover, in a mobile communication system including a plurality of RATS, since the mobile station can previously obtain usage information indicating which RAT is available, the present invention can eliminate the necessity of notifying the usage information via the control channel from network and can avoid the lack of capacity of the control channel.

(13) Still further, the present invention provides a home subscriber server used in a wireless communication system comprising a first base station employing a first radio access technology and having a first cover area, a second base station employing the first radio access technology and having a second cover area that is partly or entirely included in the first cover area, the second base station being a CSG (Closed Subscriber Group) type base station which allows access to only registered mobile stations that are registered in advance, a third base station employing a second radio access technology different from the first radio access technology and having a third cover area that is almost same as the second cover area, and a mobile station including communication means which can communicates with each of the first base station and the second base station by using the first radio access technology, and can communicates with the third base station by using the second radio access technology, the home subscriber server manages information to tie the second base station, which is the CSG type base station, with the registered mobile station, wherein the home subscriber server maintains a database associated with the second base station, the database including information indicating presence of the third base station having almost same cover area as covered by the second base station, and the home subscriber server notifies, to the mobile station, the information indicating the presence of the third base station having almost same cover area as covered by the second base station.

With that feature, the mobile station can know the presence of the third base station and can access the third base station without receiving unnecessary information provided via the control channel.

(14) Still further, the present invention provides a program executed in a mobile station communicating with base stations, which are employing a plurality of different radio access technologies, by employing the different radio access technologies, the program causing the mobile station to execute a series of processes of executing procedures for registration to a CSG (Closed Subscriber Group) type base station which allows access to only registered mobile stations that are registered in advance, and obtaining, from a database associated with the CSG type base station, information of another base station employing the radio access technology that is different from a radio access technology employed by the CSG type base station.

Thus, since the procedures for registration to the CSG type base station are executed and the information of another base station employing the radio access technology, which is different from the radio access technology employed by the CSG type base station, is obtained from the database associated with the CSG type base station, the mobile station can know the presence of the third base station and can access the other base station without receiving unnecessary information provided via the control channel. Moreover, in a mobile communication system including a plurality of RATs, since the mobile station can previously obtain usage information indicating which RAT is available, the present invention can eliminate the necessity of notifying the usage information via the control channel from network and can avoid the lack of capacity of the control channel.

(15) Still further, the present invention provides a program executed in a mobile station communicating with base stations, which are employing a plurality of different radio access technologies, by employing the different radio access technologies, the program executing processes of managing a database regarding a CSG (Closed Subscriber Group) type base station which allows access to only registered mobile stations that are registered in advance, the database being maintained in the mobile station, and managing, in the database, information of another base station employing the radio access technology, which is different from a radio access technology employed by the CSG type base station, in correspondent relation to the CSG type base station.

Thus, since the procedures for registration to the CSG type base station are executed and the information of another base station employing the radio access technology, which is different from the radio access technology employed by the CSG type base station, is obtained from the database associated with the CSG type base station, the mobile station can know the presence of the third base station and can access the other base station without receiving unnecessary information provided via the control channel. Moreover, in a mobile communication system including a plurality of RATS, since the mobile station can previously obtain usage information indicating which RAT is available, the present invention can eliminate the necessity of notifying the usage information via the control channel from network and can avoid the lack of capacity of the control channel.

(16) Still further, the present invention provides an integrated circuit incorporated in a mobile station and causing the mobile station to execute a plurality of functions, the integrated circuit causing the mobile station to execute a series of functions of communicating with base stations, which are employing a plurality of different radio access technologies, by employing the different radio access technologies, maintaining information regarding a CSG (Closed Subscriber Group) type base station which allows access to only registered mobile stations that are registered in advance, and maintaining information of another base station employing the radio access technology, which is different from a radio access technology employed by the CSG type base station, in correspondent relation to the information of the CSG type base station.

Thus, since the procedures for registration to the CSG type base station are executed and the information of another base station employing the radio access technology, which is different from the radio access technology employed by the CSG type base station, is obtained from the database associated with the CSG type base station, the mobile station can know the presence of the third base station and can access the other base station without receiving unnecessary information provided via the control channel. Moreover, in a mobile communication system including a plurality of RATS, since the mobile station can previously obtain usage information indicating which RAT is available, the present invention can eliminate the necessity of notifying the usage information via the control channel from network and can avoid the lack of capacity of the control channel.

(17) Still further, the present invention provides a CSG (Closed Subscriber Group) type base station used in a wireless communication system comprising a first base station employing a first radio access technology and having a first cover area, a second base station employing a second radio access technology different from the first radio access technology and having a second cover area that is partly or entirely included in the first cover area, a mobile station communicating with each of the base stations employing the first radio access technology or second radio access technology by employing the first radio access technology or the second radio access technology, the CSG type base station which allows access to only registered mobile stations that are registered in advance, and a home subscriber server that manages information to tie the CSG type base station with the registered mobile station, the CSG type base station employing the first radio access technology and having same cover area as the second cover area, wherein the CSG type base station obtains information of the second base station from a database, the database maintaining information of the second base station having the second cover area and information of the CSG type base station in correlated form, and provides the obtained information to the mobile station.

Thus, when the mobile station executes the procedures for registration, the CSG type base station obtains the information of the second base station from a database, which maintains information of at least one second base station employing the radio access technology, which is different from the radio access technology employed by the CSG type base station, and information of the CSG type base station in correlated form, and then provides the obtained information to the mobile station. Accordingly, the mobile station can know the presence of the third base station and can access the second base station without receiving unnecessary information provided via the control channel. Moreover, in a mobile communication system including a plurality of RATS, since the mobile station can previously obtain usage information indicating which RAT is available, the present invention can eliminate the necessity of notifying the usage information via the control channel from network and can avoid the lack of capacity of the control channel.

Advantageous Effects of Invention

According to the present invention, in a mobile communication system including a plurality of Radio Access Technologies, it is possible to eliminate the necessity of using a control channel to notify information indicating the Radio Access Technology, and to avoid the lack of capacity of the control channel.

DESCRIPTION OF EMBODIMENTS

Embodiments of the present invention will be described in detail below with reference to the accompanying drawings. It is to be noted that the following description uses LTE as a first Radio Access Technology and WLAN as a second Radio Access Technology as its example unless otherwise specified, but the present invention is not limited to such a combination.

Figure 1:
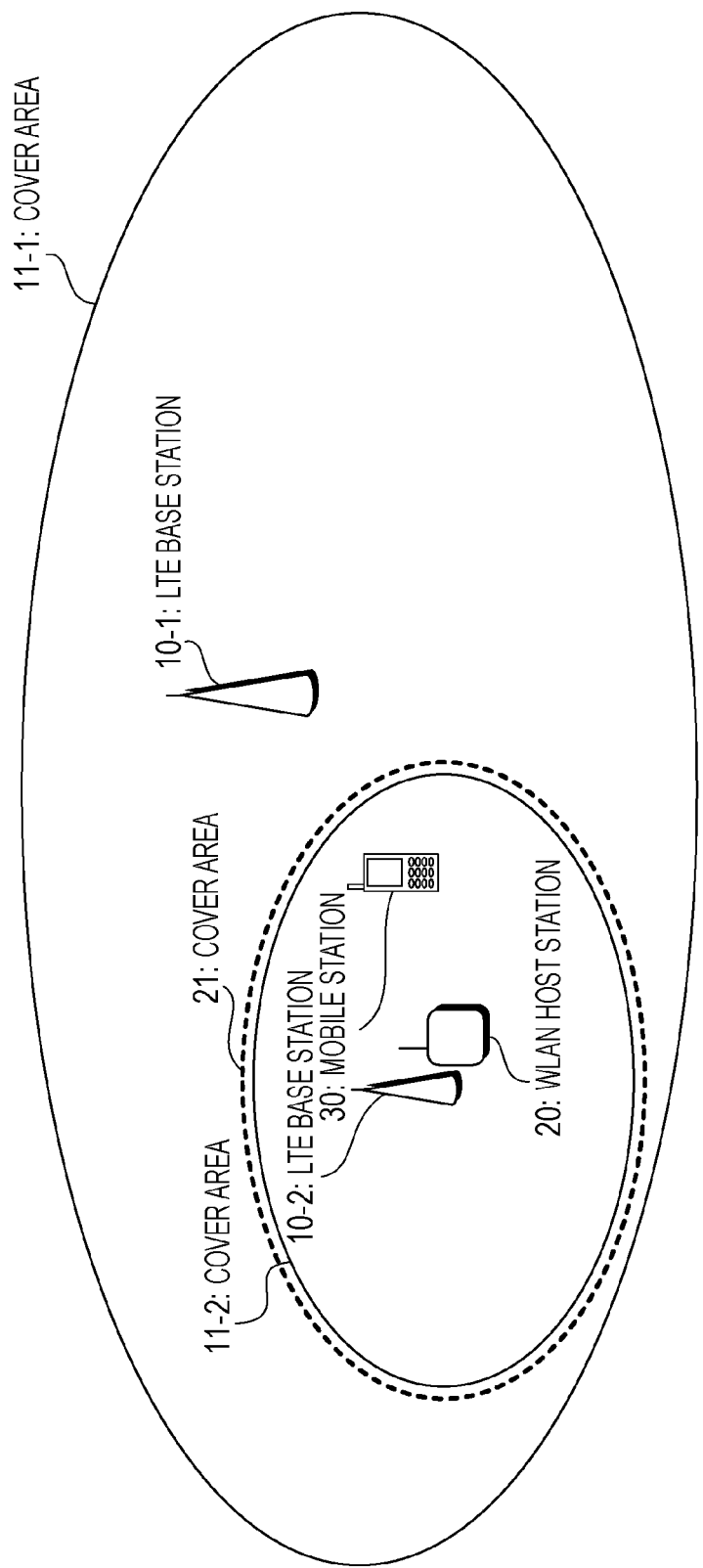
FIG. 1 illustrates a configuration example of cover areas in the present invention.

FIG. 1 illustrates a configuration example of cover areas in the present invention. As illustrated in FIG. 1, in a wide-area mobile communication system, a cover area 21 of WLAN (i.e., a cover area of a narrow-area communication system) is entirely included in a part of a cover area 11-1 of LTE (i.e., a cover area of a wide-area communication system). Stated in another way, a part of the cover area 11-1 of LTE and the entirety of the cover area 21 of WLAN are overlapped with each other.

Furthermore, as illustrated in FIG. 1, in the mobile communication system according to the embodiments described below, an LTE base station 10-1 of a wide-area communication system has a cover area 11-1 and transmits a signal to a mobile station 30 in the cover area 11-1. An LTE base station 10-2 of a narrow-area communication system has almost same cover area 11-2 as the cover area 21 of a WLAN host station 20 and transmits a signal to the mobile station 30 in the cover area 11-2. Thus, the mobile station 30 not only directly receives the signal transmitted from the LTE base station 10-1 in the cover area 11-1, but also receives the signal relayed by the LTE base station 10-2 in the cover area 11-2 (i.e., the cover area 21). In the following description, the LTE base stations 10-1, 10-2, . . . , 10-*n* are also collectively referred to as the "LTE base station 10".

In some cases, the LTE base station 10 and the WLAN host station 20 may be provided as a composite device installed in a single housing, for example.

The LTE base station 10-2 of the narrow-area communication system is a CSG (Closed Subscriber Group) type base station limiting mobile stations, which are allowed to access the relevant CSG, to particular mobile stations 30. When the mobile station 30 is allowed to access to the LTE base station 10-2, certain registration procedures are executed in advance. As a result of the registration procedures, for example, a list of terminal IDs of the accessible mobile stations, including the mobile station 30, is set in the LTE base station 10-2. Similarly, a list of the accessible LTE base stations, including the LTE base station 10-2, is set in the mobile station 30.

As seen from FIG. 1, while the mobile station 30 is connected to the LTE base station 10-1, it is unknown to the mobile station 30 whether the mobile station 30 can connect to the WLAN host station 20 in the cover area 21. However, when the mobile station 30 has handovered to the LTE base station 10-2, it is ensured that the mobile station 30 can connect to the WLAN host station 20 in the cover area 21.

The present invention proposes a method which enables the mobile station to associate the fact that the mobile station has entered into the cover area of the WLAN host station 20 upon the mobile station has established connection to the LTE base station 10-2, by utilizing the facts that the LTE base station 10-2 is the CSG type base station and there exists a subscriber database, which is tied to the CSG type base station to register mobile stations to limit access to only previously-registered mobile stations.

Figure 2:
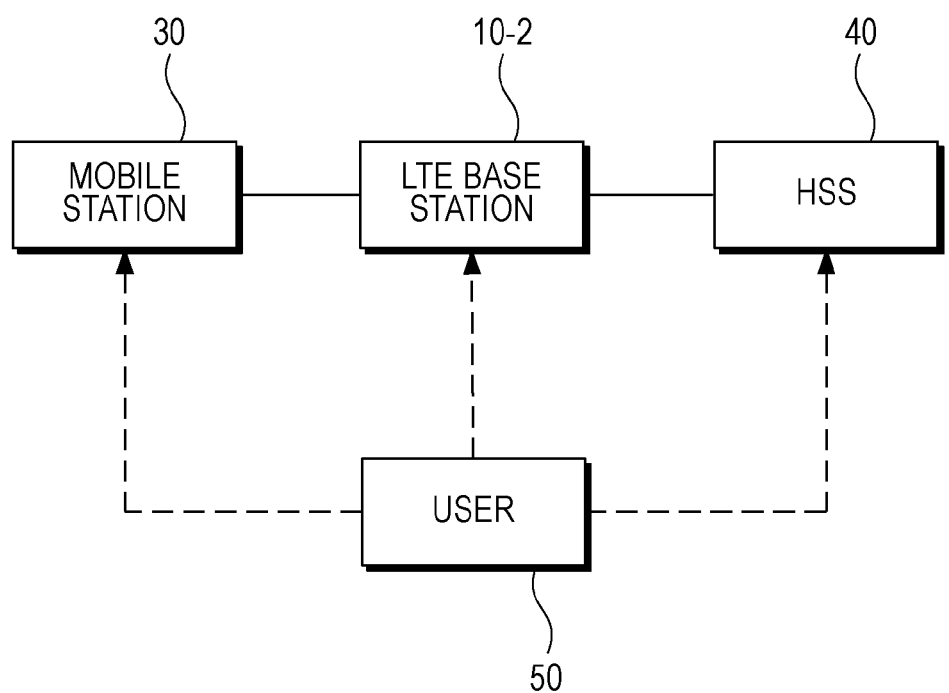
FIG. 2 is a block diagram illustrating a configuration of a mobile communication system according to the present invention.

FIG. 2 is a block diagram illustrating the configuration of a mobile communication system according to the present invention. The LTE base station 10-2 as the CSG cell is required to prepare and manage a list of the mobile stations 30 which is able to access the LTE base station 10-2. A Home Subscriber Server 40 (in the case taking the LTE system as an example, hereinafter abbreviated to a "HSS") provides a database for managing subscriber information in the mobile communication system, and the HSS 40 also manages a CSG list indicating the mobile stations 30 is able to access the LTE base station 10-2. It is further supposed that, when the mobile stations 30 is registered into the list of the LTE base station 10-2, information including the base station ID of the LTE base station 10-2, the mobile station IDs of the registered mobile stations 30, etc. is given and included in the list.

It is further supposed that, the mobile station 30 may also manage list of the LTE base stations 10 which are allowed to be accessed from the mobile station 30, as corresponding to the list of the mobile stations 30 which is able access to each of LTE base station 10 managed in HSS 40. In response to update of the database executed in HSS 40 upon, e.g., registration to the CSG, the list in the mobile station 30 is also updated to keep correspondence to the list in the HSS 40.

First Embodiment

In a first embodiment, the HSS 40 manages a tag indicating the presence of the WLAN host station 20 that has almost same cover area 21 as covered by the LTE base station 10-2, and the mobile station 30 can know the presence of the third base station and can access the WLAN host station 20 without receiving unnecessary information provided via a control channel.

Figure 3:
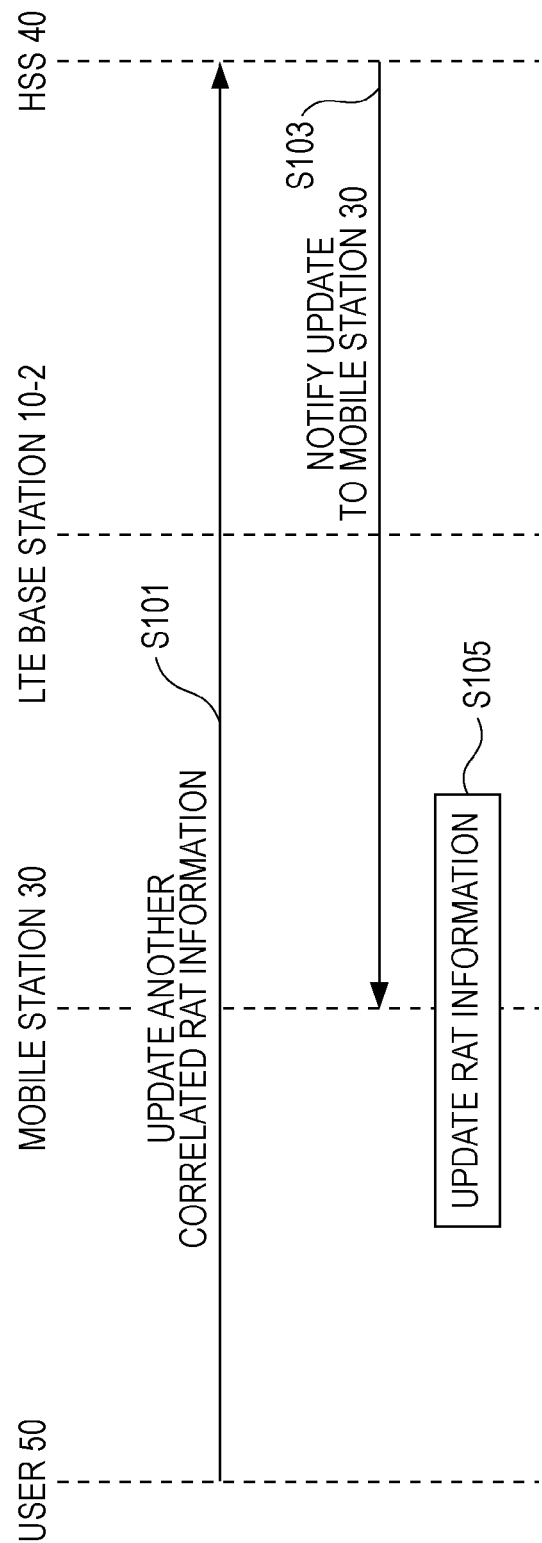
FIG. 3 is a sequence chart illustrating an example of management procedure for a tag, which indicates the presence of a WLAN host station 20 having almost same cover area 21 as covered by an LTE base station 10-2, in a first embodiment of the present invention.

FIG. 3 is a sequence chart illustrating an example of management procedures for the tag, which indicates the presence of the WLAN host station 20 having almost same cover area 21 as covered by the LTE base station 10-2, in the first embodiment of the present invention. According to above-cited NPL 2 and so on, the list of the mobile stations 30 which is able to access the LTE base station 10-2 managed by the HSS 40, is updated and managed by a user 50 on a WEB page. It is naturally thought that the WLAN host station 20 and the LTE base station 10-2 both having almost same cover area 21 are deployed in the same building and are managed by the same user 50. It is also thought that the user 50 surely knows the presence of another RAT having almost same cover area as covered by the LTE base station 10-2 such as WLAN host station 20.

When the mobile station 30 is registered to the CSG, a tag indicating the presence of the above-mentioned other RAT set by the user 50 can be provided to the mobile station 30 from the HSS 40. The mobile station 30 manages the provided tag tied to each of LTE base station 10 in the list of the accessible LTE base stations 10. Furthermore, when any update occur on the database in the HSS 40 by the user 50 (step S101), the HSS 40 notifies the details of the update to all the mobile stations 30 registered in the CSG (step S103). Upon receiving the notified update, each of the mobile stations 30 updates the database therein in accordance with the notification (step S105).

Moreover, when the mobile station 30 is able to access both of the LTE base station 10-2 and the WLAN host station 20, it is natural to suppose unified management of the LTE base station 10-2 and the WLAN host station 20, since they are managed by the same administrator in the same building. Accordingly, it is further conceivable to manage, additional information of other RATs, not only information indicating the presence of RATs and the types of the RATs, but also a parameter for access for example, e.g., an encryption key of the WLAN host station 20, in the database of the HSS 40.

According to the first embodiment described above, since the HSS 40 manages the tag indicating the presence of the WLAN host station 20 having almost same cover area 21 as covered by the LTE base station 10-2, the mobile station 30 can know the presence of the third base station and can access the WLAN host station 20 without receiving unnecessary information provided via the control channel. Thus, in the mobile communication system including a plurality of RATs, since the mobile station 30 can previously obtain usage information indicating which RAT is available, the present invention can eliminate the necessity of notifying the relevant information via the control channel from network and can avoid the lack of capacity of the control channel.

Second Embodiment

In a second embodiment, the LTE base station 10-2 manages information indicating the presence of the WLAN host station 20 having almost same cover area 21 as covered by the LTE base station 10-2, such that the mobile station 30 can know the presence of the third base station and can access the WLAN host station 20 without receiving unnecessary information provided via the control channel.

Figure 4:
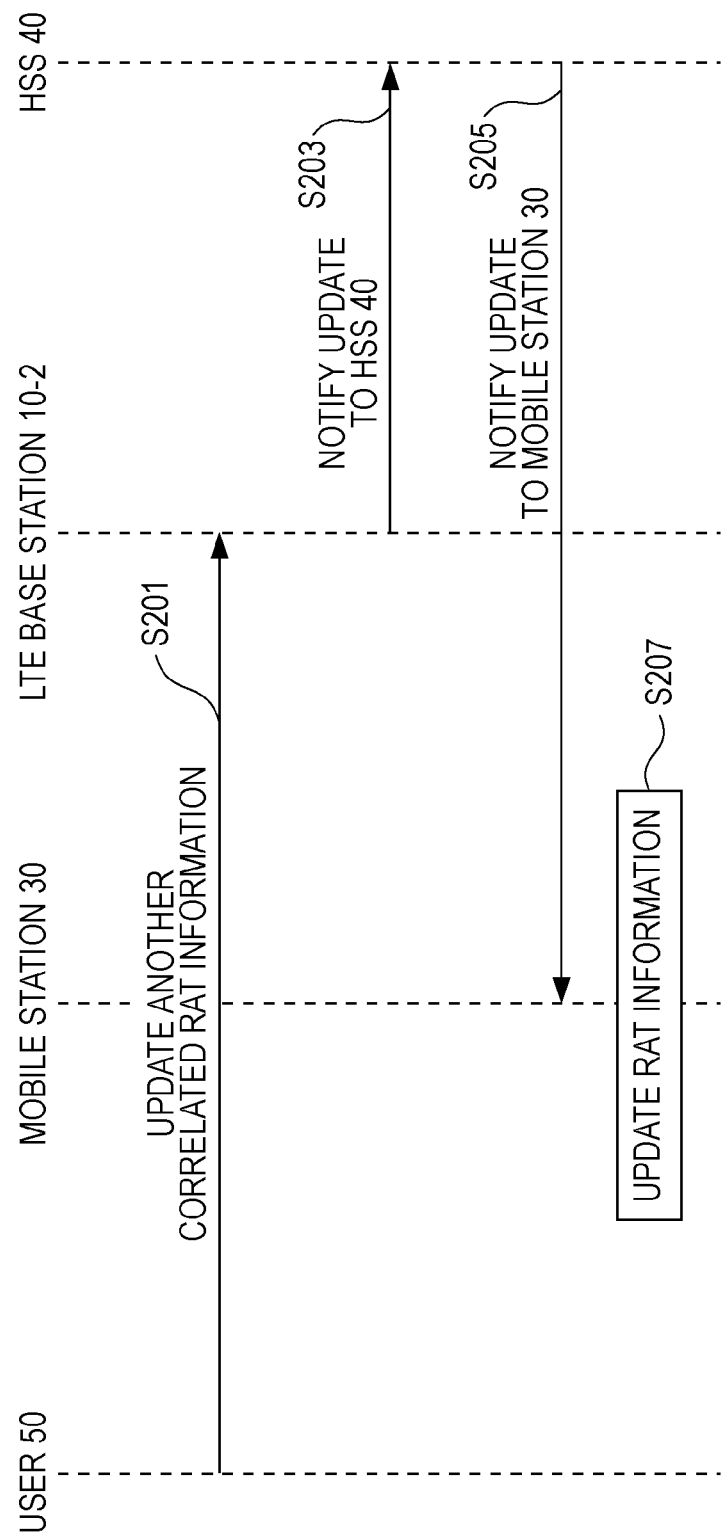
FIG. 4 is a sequence chart illustrating an example of procedure to manage the presence of the WLAN host station 20 having almost same cover area 21 as covered by the LTE base station 10-2, in a second embodiment of the present invention.

FIG. 4 is a sequence chart illustrating an example of procedures to manage the presence of the WLAN host station 20 having almost same cover area 21 as covered by the LTE base station 10-2 in LTE base station 10-2, in the second embodiment of the present invention.

The LTE base station 10-2 maintains therein a database regarding the presence of another RAT having almost same cover area as covered by the LTE base station 10-2, and the mobile station 30 also maintains a reversed database which corresponds the database in the LTE base station 10-2, and the user 50 manages the database maintained in the LTE base station 10-2.

When any update occur on the database in the LTE base station 10-2 by the user 50 (step S201), the LTE base station 10-2 notifies the details of the update to the HSS 40 (step S203). Then, the HSS 40 notifies the details of the update to all the mobile stations 30 that are registered in the CSG (step S205). Upon receiving the notified update, each mobile station 30 updates the database therein in accordance with the notification (step S207).

According to the second embodiment described above, since the LTE base station 10-2 manages the information regarding the presence of the WLAN host station 20 having almost same cover area 21 as covered by the LTE base station 10-2, the mobile station 30 can know the presence of the third base station and can access the WLAN host station 20 without receiving unnecessary information provided via the control channel. Thus, in the mobile communication system including a plurality of RATS, since the mobile station 30 can previously obtain usage information indicating which RAT is available, the present invention can eliminate the necessity of notifying the relevant information via the control channel from network and can avoid the lack of capacity of the control channel.

Moreover, the second embodiment is simpler than the first embodiment when a first RAT base station and a second RAT base station are implemented as multiple functions of a single product within the same housing. More specifically, when only the presence of RAT needs to be simply indicated, the notification may be fixedly set at the factory, and management is no longer required to the user 50. And even when a parameter for access for example, e.g., an encryption key of the WLAN host station 20, is also provided to the HSS 40, the user 50 is not required to individually manage both the parameter in the WLAN host station 20 and the parameter to the HSS 40.

Third Embodiment

In a third embodiment, the mobile station 30 manages the tag indicating the presence of the WLAN host station 20 having almost same cover area 21 as covered by the LTE base station 10-2, such that the mobile station 30 can know the presence of the third base station and can access the WLAN host station 20 without receiving unnecessary information provided via the control channel.

Figure 5:
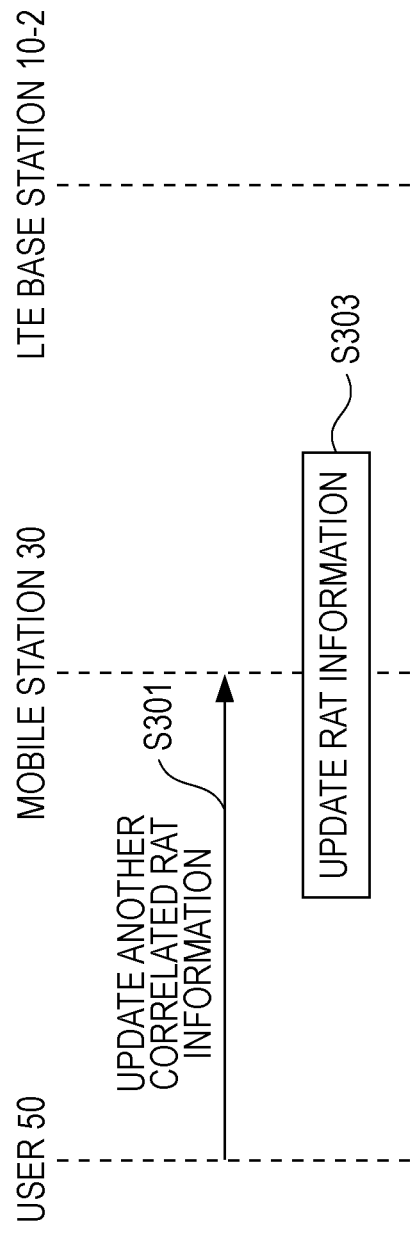
FIG. 5 is a sequence chart illustrating an example of procedure to manage the presence of the WLAN host station 20 having almost same cover area 21 as covered by the LTE base station 10-2, in a third embodiment of the present invention.

FIG. 5 is a sequence chart illustrating an example of procedures to manage the presence of the WLAN host station 20 having almost same cover area 21 as covered by the LTE base station 10-2 in the mobile station 30, in the third embodiment of the present invention. The mobile station 30 maintains therein a database regarding the presence of another RAT having almost same cover area as covered by the LTE base station 10-2 to which the mobile station 30 is able to access, and the user 50 manages the database maintained in the mobile station 30.

When there exist another RAT (such as WLAN host station 20) having almost same cover area as covered by any LTE base station (e.g., 10-2) in the list of the LTE base stations to which the relevant mobile station 30 is able to access, then the user 50 sets and manages a tag indicating the association between the LTE base station 10-2 and WLAN host station 20 for each mobile station 30. When any update occur on the database of the mobile station 30 by the user 50 (step S301), the mobile station 30 updates the database therein (step S303).

According to the third embodiment, as described above, since the mobile station 30 manages the tag indicating the presence of the WLAN host station 20 having almost same cover area 21 as covered by the LTE base station 10-2, the mobile station 30 can know the presence of the third base station and can access the WLAN host station 20 without receiving unnecessary information provided via the control channel. Thus, in the mobile communication system including a plurality of RATs, since the mobile station 30 can previously obtain usage information indicating which RAT is available, the present invention can eliminate the necessity of notifying the relevant information via the control channel from network and can avoid the lack of capacity of the control channel.

Although an operations by the user 50 has been increased, the third embodiment may have other advantage such as no HSS 40 operation is needed and setting can be closed just in the operation by user 50. Therefore the present invention can be applied to an existing mobile communication system including a Home Node B.

(1) The present invention can also be explained as follows. The present invention provides a mobile station, which communicates with a plurality of base stations employing the radio access technologies by using a plurality of different radio access technologies, wherein the mobile station obtains, from a database associated with the CSG type base station, information of another base station employing a radio access technology that is different from a radio access technology employed by the CSG type base station, during procedures of registering the mobile station to a CSG (Closed Subscriber Group) type base station which allows access to only registered mobile stations that are registered in advance.

Thus, since in the procedures for registration to the CSG type base station, the mobile station obtains, from the database associated with the CSG type base station, the information of another base station employing the radio access technology that is different from the radio access technology employed by the CSG type base station. Therefore, the mobile station can know the presence of the third base station and can access the other base station without receiving unnecessary information provided via a control channel. Moreover, in a mobile communication system including a plurality of RATS, since the mobile station can previously obtain usage information indicating which RAT is available, we can eliminate the necessity of notifying the usage information via the control channel from network and can avoid the lack of capacity of the control channel.

(2) In the mobile station of the present invention, when the information maintained in the database is updated, the information of the other base station is updated in accordance with notification from the database.

With that feature, the mobile station can know the presence of the third base station and can access the other base station without receiving unnecessary information provided via the control channel.

(3) Furthermore, the present invention provides a CSG (Closed Subscriber Group) type base station which allows access to only registered mobile stations that are registered in advance, in the procedures for registration, from a database maintaining information of at least one other base station employing a radio access technology, which is different from a radio access technology employed by the CSG type base station, and information of the CSG type base station in a correlated manner, the CSG type base station obtains the information of the other base station and provides the obtained information to the mobile station.

With that feature, the mobile station can know the presence of the third base station and can access the other base station without receiving unnecessary information provided via the control channel. Moreover, in a mobile communication system including a plurality of RATS, since the mobile station can previously obtain usage information indicating which RAT is available, the present invention can eliminate the necessity of notifying the usage information via the control channel from network and can avoid the lack of capacity of the control channel.

(4) In the CSG type base station of the present invention, the database maintains a list of the registered mobile stations capable of communicating with the relevant CSG type base station, and maintains the information of the relevant CSG type base station and the information of the other base station in a correlated manner.

With that feature, the mobile station can know the presence of the third base station and can access the other base station without receiving unnecessary information provided via the control channel.

(5) Still further, the present invention provides a wireless communication system in which, by employing a plurality of different radio access technologies, mobile stations and base stations employing the radio access technologies communicate with each other, wherein the wireless communication system comprises a CSG (Closed Subscriber Group) type base station which allows access to only registered mobile stations that are registered in advance, at least one another base station employing a radio access technology that is different from a radio access technology employed by the CSG type base station, a database maintaining a list of the registered mobile stations capable of communicating with the CSG type base station and maintaining the information of the CSG type base station and the information of the other base station in a correlated manner, and the mobile station communicating with the base stations employing the radio access technologies, wherein the mobile station obtains, from the database, the information of the other base station employing the radio access technology that is different from the radio access technology employed by the CSG type base station, during procedures of registering the mobile station to the CSG type base station.

Thus, in the procedures for registration to the CSG type base station, the mobile station obtains, from the above-mentioned database, the information of the other base station employing the radio access technology that is different from the radio access technology employed by the CSG type base station. Therefore, the mobile station can know the presence of the third base station and can access the other base station without receiving unnecessary information provided via the control channel. Moreover, in a mobile communication system including a plurality of RATS, since the mobile station can previously obtain usage information indicating which RAT is available, the present invention can eliminate the necessity of notifying the usage information via the control channel from network and can avoid the lack of capacity of the control channel.

(6) In the wireless communication system of the present invention, when the information of the other base station is updated, the database notifies the updated information of the other mobile station to the mobile station, and the mobile station updates the information of the other mobile station in accordance with the notification from the database.

With that feature, the mobile station can know the presence of the third base station and can access the other base station without receiving unnecessary information provided via the control channel.

(7) In the wireless communication system of the present invention, when the information of the other base station is updated, the CSG type base station notifies the update of the information of the other base station to the database, the database updates the information of the other base station in accordance with the notification from the CSG type base station and notifies the updated information of the other mobile station to the mobile station, and the mobile station updates the information of the other mobile station in accordance with the notification from the database.

With that feature, the mobile station can know the presence of the third base station and can access the other base station without receiving unnecessary information provided via the control channel.

(8) In the wireless communication system of the present invention, the mobile station communicates with the other base station by employing the radio access technology, which is different from the radio access technology employed by the CSG type base station, in accordance with the information of the other base station.

With that feature, the mobile station can know the presence of the third base station and can access the other base station without receiving unnecessary information provided via the control channel.

(9) Still further, the present invention provides a program executed in a mobile station communicating, by employing a plurality of different radio access technologies, with base stations employing the radio access technologies, wherein the program causes the mobile station to perform a series of processes of executing procedures for registration to a CSG (Closed Subscriber Group) type base station which allows access to only registered mobile stations that are registered in advance, and obtaining, from a database associated with the CSG type base station, information of another base station employing a radio access technology that is different from a radio access technology employed by the CSG type base station.

Thus, the mobile station executes the procedures for registration to the CSG type base station and obtains, from the database associated with the CSG type base station, the information of another base station employing the radio access technology that is different from the radio access technology employed by the CSG type base station. Therefore, the mobile station can know the presence of the third base station and can access the other base station without receiving unnecessary information provided via the control channel. Moreover, in a mobile communication system including a plurality of RATs, since the mobile station can previously obtain usage information indicating which RAT is available, the present invention can eliminate the necessity of notifying the usage information via the control channel from network and can avoid the lack of capacity of the control channel.

(10) Still further, the present invention provides an integrated circuit incorporated in a mobile station and causing the mobile station to execute a plurality of functions, the integrated circuit causing the mobile station to execute a series of functions of communicating, by employing a plurality of different radio access technologies, with base stations employing the radio access technologies, executing procedures for registration to a CSG (Closed Subscriber Group) type base station which allows access to only registered mobile stations that are registered in advance, and obtaining, from a database associated with the CSG type base station, information of another base station employing a radio access technology that is different from a radio access technology employed by the CSG type base station.

Thus, the mobile station executes the procedures for registration to the CSG type base station and obtains, from the database associated with the CSG type base station, the information of another base station employing the radio access technology that is different from the radio access technology employed by the CSG type base station. Therefore, the mobile station can know the presence of the third base station and can access the other base station without receiving unnecessary information provided via the control channel. Moreover, in a mobile communication system including a plurality of RATs, since the mobile station can previously obtain usage information indicating which RAT is available, the present invention can eliminate the necessity of notifying the usage information via the control channel from network and can avoid the lack of capacity of the control channel.

(11) Still further, the present invention provides a base station applied to a wireless communication system in which, by employing a plurality of different radio access technologies, mobile stations and base stations employing the radio access technologies communicate with each other, wherein the base station includes a CSG (Closed Subscriber Group) type communication device which allows access to only registered mobile stations that are registered in advance, and another communication device employing a radio access technology that is different from a radio access technology employed by the CSG type communication device, and wherein in the case of the mobile station executing procedures for registration, from a database storing information of at least one other base station employing the radio access technology, which is different from the radio access technology employed by the CSG type communication device, and information of the CSG type communication device in a correlated manner, the CSG type base station obtains the information of the other base station and provides the obtained information to the mobile station.

Thus, in the case of the mobile station executing the procedures for registration, from the database storing information of at least one other base station employing the radio access technology, which is different from the radio access technology employed by the CSG type communication device, and information of the CSG type communication device in a correlated manner, the CSG type base station obtains the information of the other base station and provides the obtained information to the mobile station. Therefore, the mobile station can know the presence of the third base station and can access the other base station without receiving information provided via the control channel. Moreover, in a mobile communication system including a plurality of RATs, since the mobile station can previously obtain usage information indicating which RAT is available, the present invention can eliminate the necessity of notifying the usage information via the control channel from network and can avoid the lack of capacity of the control channel.

Programs operating in the LTE base station 10, the mobile station 30, and the HSS 40 according to the present invention are programs for controlling a CPU, etc. (i.e., programs causing a computer to function) in such a way that the functions of the above-described embodiments of the present invention are realized. Information handled by those stations and so on is temporarily stored in a RAM when the relevant information is to be processed. Thereafter, the information is stored in any of various ROMs or in a HDD, and is read, corrected, and written by the CPU as required. A recording medium for storing the programs may be any of semiconductor media (such as ROM and a nonvolatile memory card), optical recording media (such as DVD, MO, MD, CD and BD), and magnetic recording media (such as a magnetic tape and a flexible disk).

Furthermore, the functions of the above-described embodiments according to the present invention can be realized by not only executing loaded programs, but also by executing processing in cooperation with an operating system, another application program, etc. in accordance with instructions from the loaded programs in some cases. When the present invention is put into practice and circulated through the market, the programs may be circulated in the form stored in portable recording media, or may be transferred to a server computer via a network, e.g., the Internet. In such a case, a storage device of the server computer is also involved in the present invention.

The LTE base station 10, the mobile station 30, and the HSS 40 in the above-described embodiments may be each partly or entirely realized in the form of an LSI, which is a typical integrated circuit. The functional blocks of the LTE base station 10, the mobile station 30, and the HSS 40 may be individually realized in the form of chips, or they may be partly or entirely integrated into one or more chips. The integrated circuit is not limited to the LSI, and it may be realized using a dedicated circuit or a universal processor. In addition, if a technique capable of realizing an integrated circuit instead of the LSI technique will be developed with the progress of the semiconductor technology, the integrated circuit manufactured with the developed technique can also be used.

REFERENCE SIGNS LIST

10-1, 10-2, 10 LTE base stations
11-1, 11-2 cover areas
20 WLAN host station
21 cover area
30 mobile station
40 home subscriber server (HSS)
50 user

The invention claimed is:
1. A radio communication system comprising:
 a first base station employing a first radio access technology and having a first cover area;
 a second base station employing the first radio access technology and having a second cover area that is partly or entirely included in the first cover area, the second base station being a CSG (Closed Subscriber Group) type base station communicating with only registered mobile stations that are registered in advance;

a third base station employing a second radio access technology different from the first radio access technology and having a third cover area that is partly or entirely included in the first cover area;

a mobile station including communication circuitry that is capable of communicating with each of the first base station and the second base station by employing the first radio access technology, and capable of communicating with the third base station by employing the second radio access technology; and a home subscriber server that correlates the second base station, which is the CSG type base station, with the communicable mobile station, wherein information indicating presence of the third base station is included in a database of the home subscriber server, the database being made correspondent to the second base station, the home subscriber server notifies, to the mobile station, information indicating the presence of the third base station in a case that the mobile station has entered into an overlapped area of the second cover area and the third cover area, the mobile station receives, in accordance with the notification from the home subscriber server, the information indicating the presence of the third base station, the second base station and the third base station are provided as a composite device installed in a single housing, and in a case that an update occurs on a database in the second base station, the second base station notifies the update to the home subscriber server which notifies the update to the mobile station.

2. The radio communication system according to claim 1, wherein the database of the home subscriber server further includes related information of an encryption key of the third base station.

3. A radio communication system comprising:

a first base station employing a first radio access technology and having a first cover area;

a second base station employing the first radio access technology and having a second cover area that is partly or entirely included in the first cover area, the second base station being a CSG (Closed Subscriber Group) type base station communicating with only registered mobile stations that are registered in advance;

a third base station employing a second radio access technology different from the first radio access technology and having a third cover area that is partly or entirely included in the first cover area; and a mobile station including communication circuitry that is capable of communicating with each of the first base station and the second base station by employing the first radio access technology, and capable of communicating with the third base station by employing the second radio access technology, wherein the second base station holds information indicating presence of the third base station and notifies, to the mobile station, the information indicating the presence of the third base station in a case that the mobile station has entered into an overlapped area of the second cover area and the third cover area, the mobile station receives, in accordance with the notification from the second base station, the information indicating the presence of the third base station, the second base station and the third base station are provided as a composite device installed in a single housing, and in a case that an u date occurs on a database in the second base station, the second base station notifies the u date to a home subscriber server which notifies the u date to the mobile station.

4. A mobile station used in a radio communication system comprising:

communication circuitry that communicates with a first base station, a second base station and a third base station, the first base station employing a first radio access technology and having a first cover area; the second base station employing the first radio access technology and having a second cover area that is partly or entirely included in the first cover area, the second base station being a CSG (Closed Subscriber Group) type base station and connected to a home subscriber server; and the third base station employing a second radio access technology different from the first radio access technology and having a third cover area that is partly or entirely included in the first cover area, a database regarding the second base station as a CSG type base station with which a registered mobile station is able to communicate, and the database includes information indicating presence of the third base station; and receiving circuitry that receives, in accordance with a notification from the home subscriber server, information indicating the presence of the third base station in a case that the mobile station has entered into an overlapped area of the second cover area and the third cover area; wherein the home subscriber server correlates the second base station, and the information indicating the presence of the third base station is included in a database of the home subscriber server, the database being made correspondent to the second base station, the second base station and the third base station are provided as a composite device installed in a single housing, and in a case that an update occurs on a database in the second base station, the second base station notifies the update to the home subscriber server which notifies the update to the mobile station.

5. The mobile station according to claim 4, wherein the database further includes related information of an encryption key of the third base station.

* * * * *